US008413172B2

(12) United States Patent
Sng

(10) Patent No.: US 8,413,172 B2
(45) Date of Patent: Apr. 2, 2013

(54) METHOD AND SYSTEM FOR SOCKET API CALL EMULATION

(75) Inventor: Swee Huat Sng, Torrance, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 1006 days.

(21) Appl. No.: 12/229,132

(22) Filed: Aug. 20, 2008

(65) Prior Publication Data

US 2010/0050189 A1 Feb. 25, 2010

(51) Int. Cl.
*G06F 3/00* (2006.01)
(52) U.S. Cl. ......... 719/321; 709/220; 709/221; 709/222
(58) Field of Classification Search .................. None
See application file for complete search history.

(56) References Cited

U.S. PATENT DOCUMENTS

| 6,904,489 | B2 | 6/2005 | Zarns ............................ 710/315 |
|---|---|---|---|
| 7,185,136 | B2 | 2/2007 | Zarns ............................ 710/315 |
| 2003/0088727 | A1 | 5/2003 | Zarns ............................ 710/313 |
| 2003/0131136 | A1* | 7/2003 | Emerson et al. ............. 709/250 |
| 2003/0154313 | A1 | 8/2003 | Barenjee et al. ............. 709/250 |
| 2005/0210176 | A1 | 9/2005 | Zarns ............................ 710/315 |
| 2005/0246450 | A1* | 11/2005 | Enko et al. .................... 709/230 |
| 2006/0224664 | A1* | 10/2006 | Giliberto et al. .............. 709/203 |
| 2008/0304486 | A1* | 12/2008 | Graessley et al. ............ 370/392 |

FOREIGN PATENT DOCUMENTS

| EP | 1393174 B1 | 7/2007 |
|---|---|---|
| JP | 2000-236348 | 8/2000 |
| JP | 20010167293 | 3/2001 |
| JP | 2003-274100 | 9/2003 |
| JP | 2004-355511 | 12/2004 |

* cited by examiner

*Primary Examiner* — Emerson Puente
*Assistant Examiner* — Sisley Kim
(74) *Attorney, Agent, or Firm* — Scot A. Reader

(57) ABSTRACT

A method and system for socket API call emulation facilitates communication between an application and non-networked I/O devices. The present invention intercepts and modifies IP-aware socket API calls en route from the application to non-networked I/O devices so that such calls are received by non-networked I/O devices as IP-unaware I/O access calls. The invention allows the application to use socket API calls to communicate with all entity types and thereby relieves an application developer of the burden to write and debug/edit separate code and documentation for non-networked I/O device types with which an application is expected to communicate. Socket API call emulation is in some embodiments performed by an emulation module within a socket API operatively coupled between an application and a device driver associated with a non-networked I/O device.

14 Claims, 6 Drawing Sheets

```
/* create sockets */
socket1=socket(AF_INET, SOCK_STREAM, 0); /* Ethernet */
socket2=socket(AF_INET, SOCK_STREAM, 0); /* COM port */
socket3=socket(AF_INET, SOCK_STREAM, 0); /* LPT port */
...
/* bind to Ethernet interface */
servAddr.sin_family=AF_INET;
servAddr.sin_addr.s_addr=htonl(INADDR_ANY);
servAddr.sin_port=htons(9100);
bind(socket1, (struct sockaddr *) &servAddr, sizeof(servAddr));
...
/* bind to COM port interface */
h=gethostbyname("127.0.1.1");
memcpy((char *) &servAddr.sin_addr.s_addr, h->h_addr_list[0], h->h_length);
servAddr.sin_family=AF_INET;
servAddr.sin_port=htons(9101);
bind(socket2, (struct sockaddr *) &servAddr, sizeof(servAddr));
...
/* bind to LPT port interface */
h=gethostbyname("127.0.2.1");
memcpy((char *) &servAddr.sin_addr.s_addr, h->h_addr_list[0], h->h_length);
servAddr.sin_family=AF_INET;
servAddr.sin_port=htons(9102);
bind(socket3, (struct sockaddr *) &servAddr, sizeof(servAddr));
...
```

```
/* make them all listening ports */
listen(socket1, 5);
listen(socket2, 5);
listen(socket3, 5);
...
/* check for incoming data */
FD_ZERO(&rfds);
FD_SET(socket1, &rfds);
FD_SET(socket2, &rfds);
FD_SET(socket3, &rfds);
...
retval = select(maxfds, &rfds, 0, &rfds, 0x0);
...
/* accept the connection */
if (FD_ISSET(socket1, &rfds))
    newsock = accept(socket1, (structs sockaddr *) &cliAddr, &cliLen);
else if (FD_ISSET(socket2, &rfds))
    newsock = accept(socket2, (structs sockaddr *) &cliAddr, &cliLen);
else if (FD_ISSET(socket2, &rfds))
    newsock = accept(socket2, (structs sockaddr *) &cliAddr, &cliLen);
...
```

```
/* read incoming print data */
while (retval = recv(neswock, buffer, sizeof(buffer), 0) >0)
{
    ...
    /* process print data */
    printData(buffer, retval);
}
...
/* close input print stream */
close(newsock)
```

Figure 6

METHOD AND SYSTEM FOR SOCKET API CALL EMULATION

BACKGROUND OF THE INVENTION

The present invention relates to communication between an application and non-networked input/output (I/O) devices and, more particularly, to a method and system for emulating socket application programming interface (API) calls to facilitate communication between an application executing on a computing device and non-networked I/O devices that are connected directly to the computing device.

Applications executing on computing devices use application programming interface (API) calls to communicate with other entities. API calls are handled using a variety of transport mechanisms depending on the destination entity. An API call destined to an application on a networked I/O device reachable by the computing device hosting the source application may be a socket API call handled using an IP-aware transport mechanism (e.g. TCP/IP packet), whereas an API call destined to a non-networked I/O device connected directly to the computing device hosting the source application, such as a RS-232 (COM), Universal Serial Bus (USB), Institute of Electrical and Electronics Engineers (IEEE) Std. 1284 (Parallel Port) and/or IEEE Std. 1394 (FireWire) I/O device, may be handled using an IP-unaware transport mechanism supported by the non-networked I/O device.

Because of differences among transport mechanisms, application developers have conventionally had to develop and maintain separate code and documentation for each type of entity with which an application is expected to communicate. This requirement of separate coding and documentation has increased the amount of time and money spent on software development and increased code complexity.

SUMMARY OF THE INVENTION

In a basic feature, the present invention provides a method and system for socket API call emulation that facilitates communication between an application and non-networked I/O devices. The present invention intercepts and modifies IP-aware socket API calls en route from the application to non-networked I/O devices so that such calls are received by non-networked I/O devices as IP-unaware I/O access calls. The invention allows the application to use socket API calls to communicate with all entity types and thereby relieves an application developer of the burden to write and debug/edit separate code and documentation for non-networked I/O device types with which an application is expected to communicate. Socket API call emulation is in some embodiments performed by an emulation module within a socket API operatively coupled between an application and a device driver associated with a non-networked I/O device.

In one aspect of the invention, a computing device comprises an application, a socket API operatively coupled with the application and a non-networked I/O device driver operatively coupled with the socket API, wherein the socket API receives from the application a socket API call and in response selectively delivers to the non-networked I/O device driver based on an IP address included in the socket API call an IP-unaware I/O access call corresponding to the socket API call.

In some embodiments, the IP address is a loopback address.

In some embodiments, the socket API delivers the IP-unaware call to the non-networked I/O device driver in response to determining that the IP address is assigned to a non-networked I/O device port associated with the non-networked I/O device driver.

In some embodiments, the socket API delivers the socket API call to a TCP/IP protocol stack in response to determining that the IP address is not assigned to a non-networked I/O device port associated with the non-networked I/O device driver.

In some embodiments, the non-networked I/O device driver is selected from the group consisting of a COM, USB, Parallel Port and FireWire device driver.

In some embodiments, the socket API selectively delivers to the non-networked I/O device driver based further on a TCP port number included in the socket API call an IP-unaware I/O access call corresponding to the socket API call.

In another aspect of the invention, a method for socket API call emulation comprises the steps of receiving from an application a socket API call, inspecting an IP address included in the socket API call and selectively delivering to a non-networked I/O device driver based on the IP address an IP-unaware I/O access call corresponding to the socket API call.

In some embodiments, the IP address is a loopback address.

In some embodiments, the IP-unaware I/O access call is delivered to the non-networked I/O device driver in response to determining that the IP address is assigned to a non-networked I/O device port associated with the non-networked I/O device driver.

In some embodiments, the socket API call is delivered to a TCP/IP protocol stack in response to determining that the IP address is not assigned to a non-networked I/O device port associated with the non-networked I/O device driver.

In some embodiments, the non-networked I/O device driver is selected from the group consisting of a COM, USB, Parallel Port and FireWire device driver.

In yet another aspect of the invention, a computing device comprises an application and a socket API operatively coupled with the application, wherein the socket API receives from the application a socket API call and in response identifies a non-networked I/O device port as a destination for the call based on an IP address included in the call.

In some embodiments, the IP address is a loopback address.

In some embodiments, the non-networked I/O device port is a COM port.

In some embodiments, the non-networked I/O device port is a USB port.

In some embodiments, the non-networked I/O device port is a Parallel Port.

In some embodiments, the non-networked I/O device port is a FireWire port.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIGS. 4-6 show user screens with application pseudocode for execution in conjunction with socket API call emulation on a computing device.

DETAILED DESCRIPTION OF A PREFERRED EMBODIMENT

Figure 1:
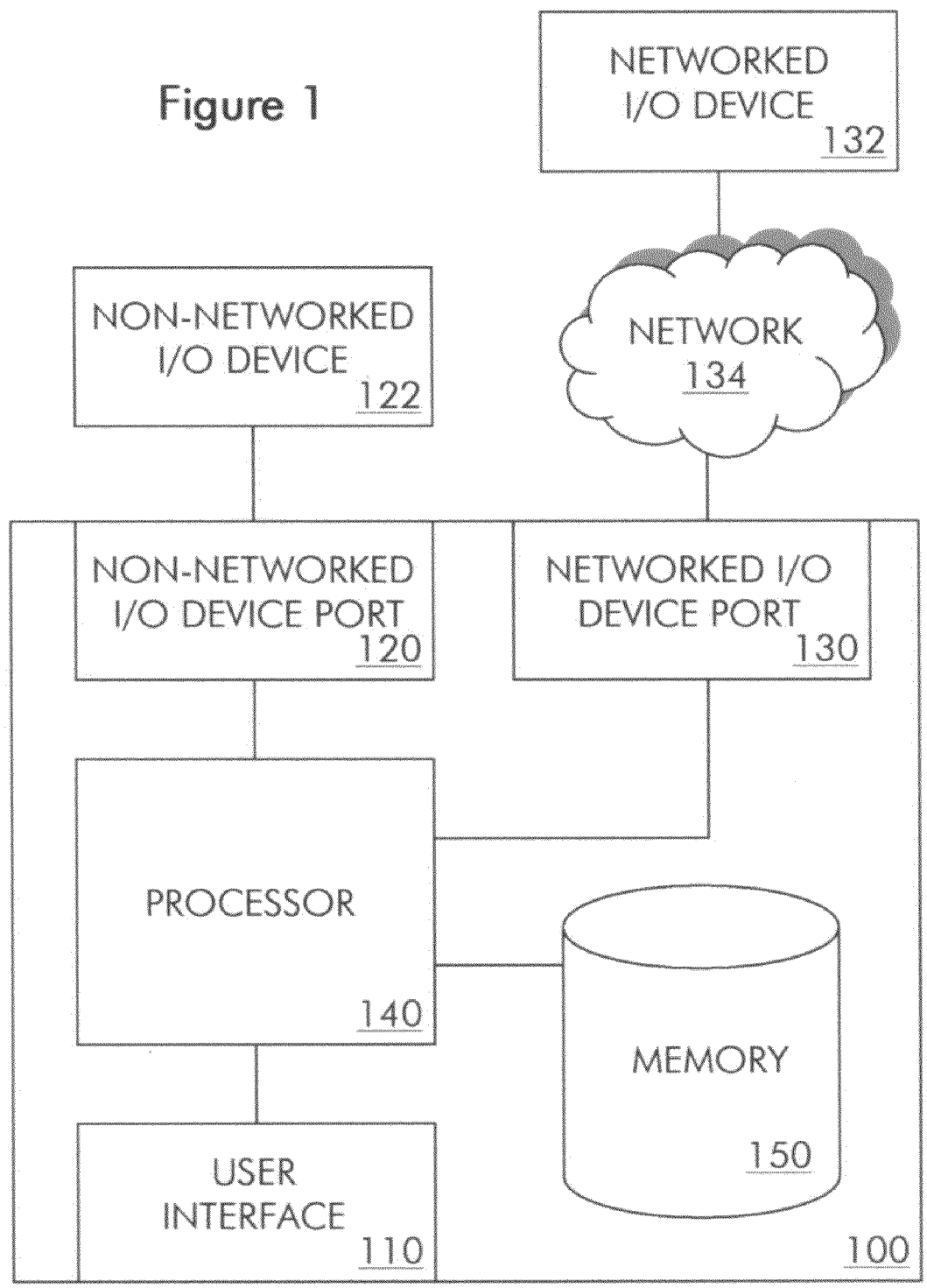
FIG. 1 shows a computing device in some embodiments of the invention.

FIG. 1 shows a computing device 100 in some embodiments of the invention. Computing device 100 has a processor 140 communicatively coupled between a user interface 110, a non-networked I/O device port 120, a networked port 130 and a memory 150. Computing device 100 may be, for example, a personal computer, personal data assistant (PDA), cellular phone or multifunction peripheral (MFP) device.

User interface 110 receives inputs from a user of computing device 100 via one or more input devices and displays outputs to the user via one or more output devices. Output devices include a display, such as a liquid crystal display (LCD), organic light emitting diode (OLED) display. Input devices include, for example, a finger or stylus-operated touch screen, a scroll wheel or ball, a keypad and/or voice command module.

Non-networked I/O device port 120 is a wired communication interface for transmitting and receiving information to/from a non-networked I/O device 122 over a wired connection. Non-networked I/O device 122 may be, for example, a personal computer, PDA, cellular phone, MFP device, server device or data storage element. Non-networked I/O device port 120 may be a serial or parallel interface, such as a COM, USB, Parallel Port or FireWire interface, for example. In some embodiments, computing device 100 has multiple non-networked I/O device ports of various types for transmitting and receiving information to/from a respective multiple of non-networked I/O devices.

Networked I/O device port 130 is a wired or wireless communication interface for transmitting and receiving information to/from a networked I/O device (e.g. 132) over a network 134 having wired and/or wireless links and connective devices, such as routers, switches and/or bridges. Networked I/O device 132 may be, for example, a personal computer, PDA, cellular phone, MFP device, server device or storage element. Networked I/O device port 130 may be, for example, a wired Ethernet interface, wireless Ethernet (WiFi) interface or Worldwide Interoperability for Microwave Access (WiMAX) interface.

Figure 2:
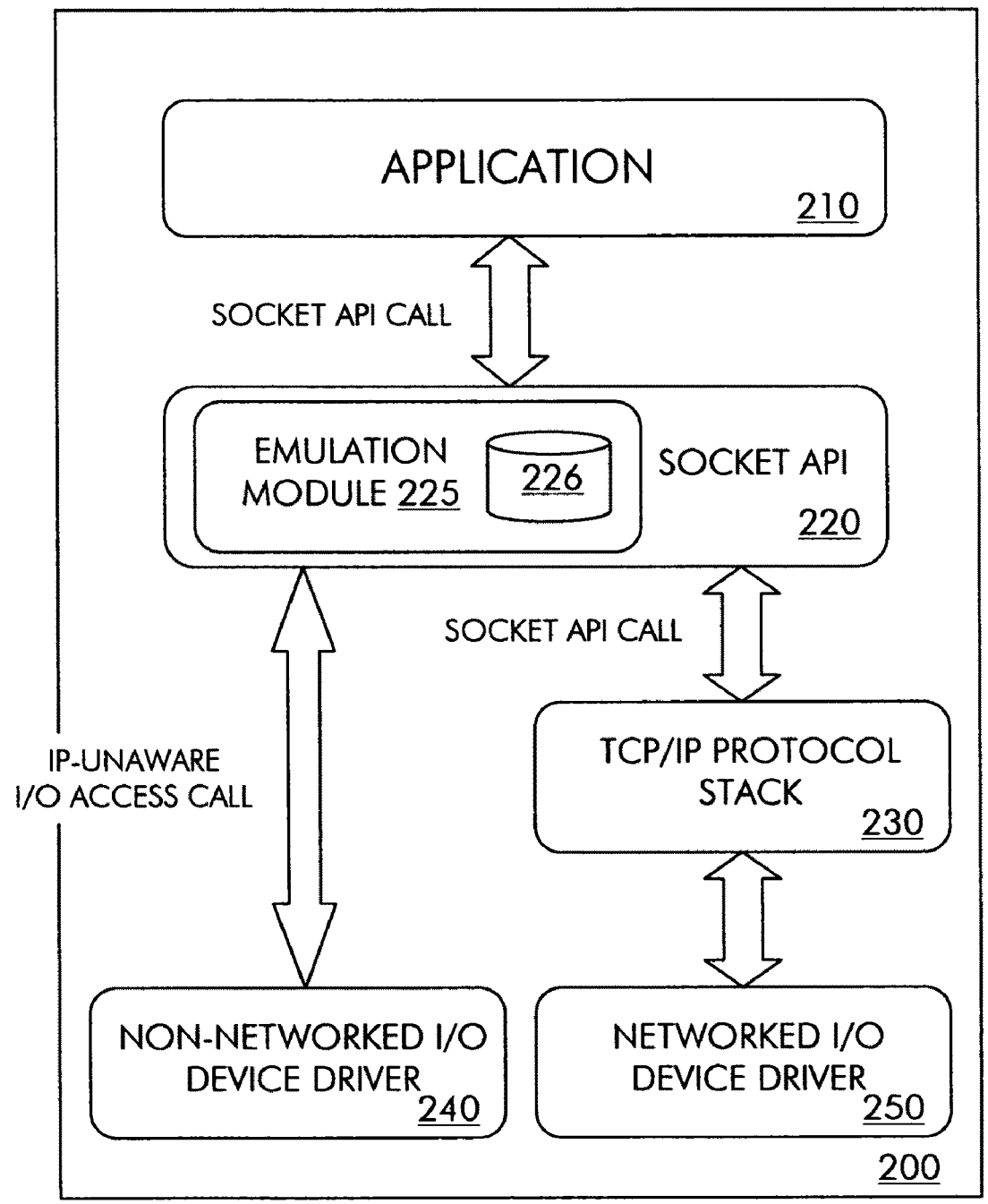
FIG. 2 shows software executable on the computing device in some embodiments of the invention.

Processor 140 executes in software operations supported by computing device 100. Turning to FIG. 2, software elements of computing device 100 executable by processor 140 include an application 210, a socket API 220, a TCP/IP protocol stack 230, a non-networked I/O device driver 240 and a networked I/O device driver 250. Socket API 220 includes an emulation module 225 and a data store 226 that stores an IP address assigned to non-networked I/O device port 120. Software elements executable by processor 140 are stored in memory 150, which includes one or more random access memories (RAM) and one or more read only memories (ROM). In some embodiments, socket API 220, TCP/IP stack 230, non-networked I/O device driver 240 and networked I/O device driver 250 are part of an embedded operating system.

Application 210 communicates with non-networked I/O device 122 via non-networked I/O device driver 240 and non-networked I/O device port 120, and communicates with networked I/O device 132 via TCP/IP protocol stack 230, networked I/O device driver 250 and networked I/O device port 130, by generating and delivering to socket API 220 socket API calls. Socket API calls are IP-aware, that is, use IP addressing to identify call destinations.

Socket API 220 interfaces with application 210 and, via emulation module 225, with non-networked I/O device driver 240 to enable communication between application 210 and non-networked I/O device 122. Socket API 220 also interfaces with TCP/IP stock 230 to enable communication between application 210 and an application on networked I/O device 132. Socket API 220 processes socket API calls received from application 210 to create sockets that provide endpoints for data sessions, bind sockets to destination IP addresses assigned to I/O entities and remove bindings and close sockets when they are no longer needed. Such sockets include a socket bound to an IP address assigned to non-networked I/O device port 120 and a socket bound to an IP address assigned to networked I/O port 130.

Emulation module 225 is a software subsystem of socket API 220 that performs socket API call emulation to enable application 210 and non-networked I/O device 122 to seamlessly communicate. When socket API 220 receives a socket API call from application 210, module 225 inspects the socket API call and determines whether a destination IP address included in the IP-aware socket API call is stored in data store 226. If so, the socket API call is intended for non-networked I/O device 122, and socket API 220 delivers to non-networked I/O device driver 240 an IP-unaware I/O access call corresponding to the socket API call for further processing. If a destination IP address included in the socket API call is not stored in data store 226, socket API 220 delivers to TCP/IP protocol stack 230 the socket API call for further processing.

In some embodiments, the IP addresses assigned to non-networked I/O device port 120 are loopback addresses. IP version 4 (IPv4) addresses in the range of 127.0.0.0 to 127.255.255.255 are reserved for an internal loopback function and are not transmitted by any networked I/O device. By assigning a loopback address to non-networked I/O device port 120, there is no risk that the IP address assigned to non-networked I/O device port 120 will conflict with an address assigned to a networked I/O device and, additionally, IP addresses that are assignable to networked I/O devices are conserved. In the case where a computing device has multiple non-networked I/O device ports, each of the non-networked I/O device ports is assigned a distinct loopback address (e.g. COM port=127.0.1.1, Parallel Port=127.0.2.1, etc.), all of which are stored in data store 226 so that emulation module 225 (and application 210) can differentiate and separately address the multiple non-networked I/O device ports and communicate with their respective non-networked I/O devices. In some embodiments, loopback address ranges are assigned to non-networked I/O device port types, for example, COM ports may be mapped to loopback addresses in the range of 127.0.1.1 to 127.0.1.255, Parallel Ports may be mapped to loopback addresses in the range of 127.0.2.1 to 127.0.2.255 and USB ports may be mapped to loopback addresses in the range of 127.0.3.1 to 127.0.3.255.

TCP/IP stack 230 is a protocol stack that interfaces with socket API 220 and networked I/O device driver 250 and enables application 210 to communicate with an application on networked I/O device 132 via a conventional TCP connection. TCP/IP stack 230 processes socket API calls between socket API 220 and networked I/O device driver 250 and provides TCP session and IP datagram services, error handling and data buffering.

Non-networked I/O device driver 240 is software that interfaces with emulation module 225 and non-networked I/O device port 120 and enables application 210 to communicate with non-networked I/O device 122. Non-networked I/O device driver 240 receives and processes IP-unaware I/O access calls from emulation module 225. Non-networked I/O device driver 240 may be a COM, USB, Parallel Port or FireWire device driver, for example.

Networked I/O device driver 250 is software that interfaces with TCP/IP stack 230 and networked I/O device port 130 and enables application 210 to communicate with an application on networked I/O device 132 via a conventional TCP connection. Networked I/O device driver 250 in some embodiments, provides Media Access Control (MAC) and Logical Link Control (LLC) services.

Figure 3:
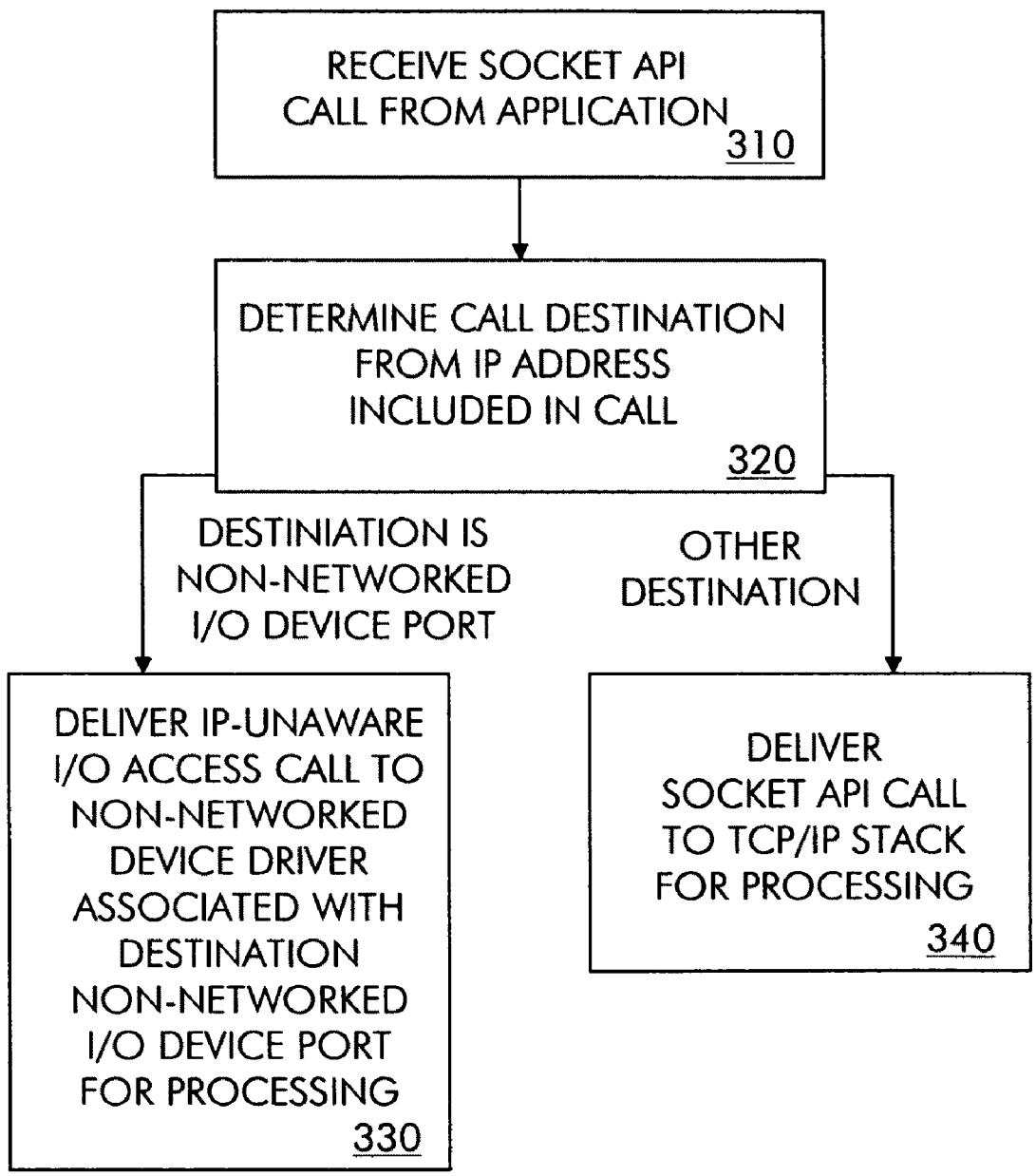
FIG. 3 shows a method for socket API call emulation on a computing device in some embodiments of the invention for a socket API call sourced by an application.

FIG. 3 shows a method for socket API call emulation on computing device 100 in some embodiments of the invention for a socket API call sourced by application 210. Socket API 220 receives the socket API call from application 210 (310). Emulation module 225 inspects a destination IP address included in the socket API call and determines by consulting data store 226 whether the socket API call is destined to non-networked I/O device port 120 (as indicated by a matching address in store 226). If the socket API call is destined to non-networked I/O device port 120, emulation module 225 makes an IP-unaware I/O access call corresponding to the socket API call to non-networked I/O device driver 240 associated with non-networked I/O device port 120 for further processing (and eventual delivery to non-networked I/O device 122) (330). The IP-unaware I/O access call addresses the same function as the socket API call but does not use IP addressing or transport mechanisms. If the socket API call is not destined to non-networked I/O device port 120, socket API 220 delivers the IP-aware socket API call to TCP/IP protocol stack 230 for further processing (340).

In some embodiments, non-networked I/O device port IP address store 226 includes both an IP address and a TCP port number for non-networked I/O device port 120. In these embodiments, when socket API 220 receives a socket API call from application 210, emulation module 225 inspects a destination IP address and TCP port number included in the socket API call and determines by consulting data store 226 whether the socket API call is destined to non-networked I/O device port 120 (as indicated by a matching address and port number in store 226). If the socket API call is destined to non-networked I/O device port 120, emulation module 225 makes an IP-unaware I/O access call corresponding to the socket API call to non-networked I/O device driver 240 associated with non-networked I/O device port 120 for further processing (and eventual delivery to non-networked I/O device 122).

FIGS. 4-6 show user screens with pseudocode executable on an application in conjunction with socket API call emulation on a computing device. The pseudocode illustrates a specific example of how socket API interface coding on an application can be simplified once support for socket API call emulation is added to the socket API. In the specific example, the computing device is an MFP and the pseudocode is listener code for processing incoming print data sourced from multiple I/O device ports including a networked I/O device port (Ethernet) and two non-networked I/O device ports (COM and LPT). LPT is an acronym for Line Print Terminal and is a Parallel Port. Coding efficiencies arise from the fact that a common set of TCP/IP-based socket API calls are used to read incoming print data received from the multiple I/O device ports. This is made possible by socket API call emulation performed by an emulation module on a socket API operatively coupled between the application and the non-networked I/O device drivers associated with the non-networked I/O device ports, as previously described in some embodiments.

Referring first to FIG. 4, TCP/IP-based sockets are created for the multiple I/O device ports using socket( ) calls and bound to their respective destinations using bind( ) calls. The COM port is assigned the loopback IP address 127.0.1.1 and TCP port number 9101 and the LPT port is assigned the loopback IP address 127.0.2.1 and TCP port number 9102. Turning next to FIG. 5, the TCP/IP-based sockets are made listening ports using listen( ) calls and the sockets wait for incoming connection requests [e.g. a socket API connect( ) call] on the multiple I/O device ports. When an incoming connection request is received on one of the multiple I/O device ports, the connection is accepted using an accept( ) call. Referring finally to FIG. 6, incoming print data is read on the accepted connection using a recv( ) call and processed, after which the connection is closed using a close( ) call.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A computing device, comprising:
    an application configured to generate socket application programming interface (socket API) calls having destination IP addresses;
    a non-networked input/output (I/O) device port;
    a non-networked I/O device driver operatively coupled with the non-networked I/O device port and configured to process IP-unaware I/O access calls;
    a networked I/O device port;
    a TCP/IP protocol stack operatively coupled with the networked I/O device port and configured to process the socket API calls having destination IP addresses; and
    an emulation module within a socket API operatively coupled with the application, the non-networked I/O device driver and the TCP/IP protocol stack and configured to receive the socket API calls from the application, inspect destination IP addresses in the socket API calls, and based on the inspections, send to the non-networked I/O device driver IP-unaware I/O access calls corresponding to the socket API calls that have a destination IP address associated with the non-networked I/O device port and send to the TCP/IP protocol stack the socket API calls that have a destination IP address not associated with the non-networked I/O device port;
    wherein the socket API interfaces with the application and, via the emulation module, with the non-networked I/O device driver to enable communication between the application and a non-networked I/O device, and also interfaces with the TCP/IP protocol stack to enable communication between the application and an application on a networked I/O device;
    wherein the emulation module compares for a match destination IP addresses in the socket API calls with a stored IP address in a data store within the socket API associated with the non-networked I/O device port; and if the destination IP address included in a socket API call is not stored in the data store, the socket API sends to the TCP/IP protocol stack the socket API call.

2. The computing device of claim 1, wherein the emulation module is further configured to inspect destination TCP port numbers in the socket API calls and send to the non-networked I/O device driver IP-unaware I/O access calls corresponding to the socket API calls that have a destination TCP port number associated with the non-networked I/O device port.

3. The computing device of claim 1, wherein the non-networked I/O device port is associated with a loopback IP address.

4. The computing device of claim 1, wherein the non-networked I/O device port is an COM port.

5. The computing device of claim 1, wherein the non-networked I/O device driver is a USB port.

6. The computing device of claim 1, wherein the non-networked I/O port is a Parallel port.

7. The computing device of claim 1, wherein the non-networked I/O port is a FireWire port.

8. A method for socket API call emulation, comprising the steps of:

receiving by an emulation module within a socket API from an application socket API calls having destination IP addresses;

inspecting by the emulation module destination IP addresses in the socket API calls; and, based on the inspections, sending by the emulation module to a non-networked I/O device driver IP—unaware I/O access calls corresponding to the socket API calls that have a destination IP address associated with a non-networked I/O device port; and sending by the emulation module to a TCP/IP protocol stack the socket API calls that have a destination IP address not associated with the non-networked I/O device port;

wherein the socket API interfaces with the application and, via the emulation module, with the non-networked I/O device driver to enable communication between the application and a non-networked I/O device, and also interfaces with the TCP/IP protocol stack to enable communication between the application and an application on a networked I/O device;

wherein the inspecting step comprises the sub-step of comparing for a match the destination IP addresses in the socket API calls with a stored IP address in a data store within the socket API associated with the non-networked I/O device port; and if the destination IP address included in a socket API call is not stored in the data store, the socket API sends to the TCP/IP protocol stack the socket API call.

9. The method of claim 8, wherein the inspecting step further comprises inspecting destination TCP port numbers in the socket API calls and the first sending step further comprises sending to the non-networked I/O device driver IP-unaware I/O access calls corresponding to the socket API calls that have a destination TCP port number associated with the non-networked I/O device port.

10. The method of claim 8, wherein the non-networked I/O device port is associated with a loopback IP address.

11. The method of claim 8, wherein the non-networked I/O device port is an COM port.

12. The method of claim 8, wherein the non-networked I/O device driver is a USB port.

13. The method of claim 8, wherein the non-networked I/O port is a Parallel port.

14. The method of claim 8, wherein the non-networked I/O port is a FireWire port.

* * * * *